United States Statutory Invention Registration [19]

[11] Reg. Number: H660

Tallent et al. [43] Published: Aug. 1, 1989

[54] METHOD AND COMPOSITION FOR IMMOBILIZATION OF WASTE IN CEMENT-BASED MATERIALS

[75] Inventors: Othar K. Tallent, Oak Ridge; Karen E. Dodson, Knoxville; Earl W. McDaniel, Oak Ridge, all of Tenn.

[73] Assignee: The United States of America as represented by the United States Department of Energy, Washington, D.C.

[21] Appl. No.: 103,149

[22] Filed: Oct. 1, 1987

[51] Int. Cl.[4] ..... G21F 9/16; C04B 7/02; C04B 7/32

[52] U.S. Cl. ..... 252/628; 106/97; 106/98; 106/104; 106/105; 106/DIG. 1; 106/287.17; 252/631

[58] Field of Search ..... 252/628, 631; 106/97, 106/98, 104, 105, 287.35, DIG. 1, 287.17

[56] References Cited

U.S. PATENT DOCUMENTS

| | | | |
|---|---|---|---|
| 2,574,843 | 11/1951 | Randall et al. | 106/104 |
| 4,042,408 | 8/1977 | Murray et al. | 106/100 |
| 4,209,335 | 6/1980 | Katayama et al. | 106/97 |
| 4,350,533 | 9/1982 | Galer et al. | 106/97 |
| 4,419,136 | 12/1983 | Rice | 106/104 |
| 4,432,666 | 2/1984 | Frey et al. | 106/90 |
| 4,452,635 | 6/1984 | Noshi et al. | 106/84 |
| 4,514,307 | 4/1985 | Chestnut et al. | 106/119 |

OTHER PUBLICATIONS

Nandi, et al., 1968, A Note on High Alumina Cement, Glass and Ceramic Bulletin, vol. 15(4): 114–117.

Tallent et al., "Fixation of Waste Materials in Grouts Part I: Empirical Correlations of Formulation Data," Oak Ridge National Laboratory, publication No. TM-9680/PI, Mar. 1986.

American Society for Testing and Materials 1984 Annual Book of ASTM Standards, vol. 04.01, publ. C305-82, "Standard Method for Mechanical Mixing of Hydraulic Cement Pastes and Mortors of Plastic Consistency," pp. 255–258.

American Society for Testing and Materials, 1984 Annual Book of ASTM Standards, vol. 04.02, publ. C192-81, "Standard Method of Making and Curing Concrete Test Specimens in the Laboratory," pp. 141–150.

*Primary Examiner*—Howard J. Locker

*Attorney, Agent, or Firm*—Katerhine Lovingood; Stephen D. Hamel; Judson R. Hightower

[57] ABSTRACT

A composition and method for fixation or immobilization of aqueous hazardous waste material in cement-based materials (grout) is disclosed. The amount of drainable water in the cured grout is reduced by the addition of an ionic aluminum compound to either the waste material or the mixture of waste material and dry-solid cement-based material. This reduction in drainable water in the cured grout obviates the need for large, expensive amounts of geling clays in grout materials and also results in improved consistency and properties of these cement-based waste disposal materials.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND COMPOSITION FOR IMMOBILIZATION OF WASTE IN CEMENT-BASED MATERIALS

FIELD OF THE INVENTION

The present invention relates to a composition and method for immobilizing aqueous hazardous industrial waste in cement-based materials. More particularly, the present invention relates to a method and composition for minimizing the amount of drainable water in cured cement-based waste disposal materials.

BACKGROUND OF THE INVENTION

Fixation or immobilization of wastes in cement-based materials, commonly called grouts is an important waste management method. Formulations prepared by mixing an aqueous hazardous waste material with a dry-solid blend consisting of cement, fly ash, clays, etc., are commonly referred to as grouts. Grout properties of importance in waste immobilization variously include the rheologic properties of freshly mixed grouts, the structural strength of cured grouts, the leach properties of cured grouts and the amount of grout phase separation exhibited at various times during curing. Phase separation, a serious problem, is defined as the formation of a liquid or aqueous phase along with the grout solid phase.

For quantification purposes, the volume of liquid phase collected on the top surface of the grout is measured following prescribed procedures. The top liquid phase is referred to as drainable water and is measured as the volume percent of the initial total volume of grout plus drainable water. It is generally recognized that the volume percent of drainable water for a particular waste grout will increase for approximately 24 hours and then decrease to some limit with further lapse of time.

Most operating criteria for grout waste immobilization processes require that the drainable water decrease to zero volume percent in 28 days or less. In most processes, it is preferred that the drainable water not exceed 5 percent after the first 24 hours. Drainable water is undesirable since it may contain radioactive and/or chemically hazardous materials from the waste which are normally required to be fixed or immobilized in the grout solid phase. At the present time, it is common practice to include a specialty geleing clay such as Attapulgite-150, a crystalline hydrated magnesium aluminum silicate, in grout mixes for purposes of decreasing the volume of drainable water. The clay is added in amounts of 8 to 20 weight percent of the dry-solids blend mixed with the waste. For some wastes, the geleing clays work well, while with others they work poorly or not at all.

The fixation of waste materials in grouts is an old process. In Oak Ridge National Laboratory Publication TM-9680/PI, *Fixation of Waste Materials in Grouts. Part* 1: Empirical Correlations of Formulation Data, O. K. Tallent et al., March, 1986, several compositions of grout were investigated and the properties of the grout compositions were measured and empirically analyzed. This publication discloses the use of grout compositions having a dry-solid blend which includes Portland Cement, Kingston fly ash, Attapulgite-150 clay and Indian Red pottery clay, an illitic clay which has the general formula $(OH)_4K_x(Al_4Fe_4Mg_4Mg_6)(Si_{8-x}Al)O_{20}$. Various compositions including these four ingredients were used to immobilize certain industrial wastes containing sulfates, nitrates, hydroxides and carbonates. Various formulations of the dry-solid mix were tested to optimize the properties of the grout compositions. In addition, this publication gives a detailed account of the methods used in measuring the properties of grout compositions. It was found that the drainable water could be minimized to an extent by incorporating significant amounts of the Attapulgite-150 clay. However, in some of the formulations examined in this publication, there existed a significant amount of drainable water after 28 days of curing.

SUMMARY OF THE INVENTION

The present invention relates to a composition which may be used as a waste disposal grout comprising an aqueous waste material, a sufficient amount of an ionic aluminum compound to reduce the amount of drainable water in the cured grout, and 6 to 10 pounds of a dry-solid blend per gallon of the waste material. The dry-solid blend includes 30 to 45 weight percent cement, 5 to 30 weight percent clay, and 30 to 62 weight percent fly ash.

In a second embodiment, the present invention also relates to a process for the immobilization of waste in cement-based materials comprising the steps of mixing an aqueous waste material with a sufficient amount of an ionic aluminum compound to reduce the amount of drainable water in the resulting cured cement-based material, and with from about 6.0 to about 10.0 pounds of a dry-solid material per gallon of the waste material. The dry-solid material includes 30 to 45 weight percent cement, 5 to 30 weight percent clay, and 30 to 62 weight percent fly ash. The mixture is then cured to produce a solid cement-based material.

Accordingly, it is the primary object of the present invention to provide a composition of waste-immobilizing grout material that will not produce drainable water after curing.

It is another object of the present invention to provide a method to eliminate waste grout drainable water without significant detriment to other grout properties.

It is a still further object of the present invention to provide a method to eliminate the use of Attapulgite-150 clay to waste grout material, while at the same time eliminating drainable water after curing.

These and other objects of the present invention will be apparent to one of ordinary skill in the art from the detailed description which follows.

DETAILED DESCRIPTION OF THE PREFERRED EMBODIMENTS

This invention relates to hazardous industrial waste disposal, and more particularly to hazardous waste fixation in cement-based materials commonly called grouts. Such grouts are generally made by mixing a dry-solid material containing cements, clays and a filler of some sort, with an aqueous waste material and curing this mixture to produce a solid cement-based grout. These grouts are useful in waste disposal since they can be pumped into near surface vaults to permanently immobilize hazardous industrial wastes. Grout mixtures can be prepared by combining an aqueous waste material with dry-solid blends following procedures outlined in the American Society for Testing and Materials in 1984 *Annual Book of ASTM Standards,* Volume 04.01, publication C305-82, "Standard Method for Mechanical Mixing of Hydraulic Cement Pastes and Waters of Plastic Consistency" and Volume 04.02, publication C192-81, "Standard Method of Making and Curing Concrete Test Specimens in the Laboratory", which are hereby incorporated by reference.

The dry-solid blends of the present invention contain from about 30 to about 45 weight percent cement, from about 30 to about 62 weight percent fly ash, and from about 5 to about 30 weight percent clay. In a more preferred embodiment, the dry-solid blend of the present invention comprises from about 30 to about 50 weight percent cement, from about 40 to about 60 weight percent fly ash, and from about 6 to about 20 weight percent clay. In the most preferred embodiment of the present invention, the dry-solid blend comprises from about 30 to about 45 weight percent cement, from about 44 to about 55 weight percent fly ash, and from about 6 to about 10 weight percent clay.

The cement used in the dry-solid formulations is generally selected from Portland cements. In particular, there are three Portland Cements which are useful in the present invention. These three types of Portland cements are commonly referred to as Type I Portland Cement, Type II Portland cement and Type III Portland Cement. Type I-II Portland Cement has been found to be the most useful in the present invention. However, depending on the particular known properties of the grout which are desired for a particular application, the other types of Portland cement may prove more desirable.

The clay used in the present invention is preferably Indian Red Pottery Clay. However, other clays which can serve as an ion-exchange medium may be substituted. Indian Red pottery clay also has the additional advantage of having the ability to entrain Cesium 137. This can be extremely important when disposing of certain types of industrial waste materials.

Another type of clay which may be used is Attapulgite-150 clay. Attapulgite-150 clay is normally incorporated into grout formulations in order to reduce the amount of drainable water in the formulations. However, Attapulgite-150 may be replaced in grout formulations by the aluminum compounds of the present invention. Accordingly, there is no need to incorporate Attapulgite-150 clays to reduce the amount of drainable water. However, Attapulgite-150 clays have a direct affect on other properties of the grout such as blend shearing, 10-minute gel strength, critical velocity and frictional pressure drop. All of these properties may be important to a particular grout formulation and therefore other reasons may exist for incorporating amounts of Attapulgite-150 clays.

In the present invention, the dry-solids mix will generally contain from about 6 to about 10 weight percent of Indian Red pottery clay as an ion-exchange medium. In addition, the grouts of the present invention may optionally include from about 8 to about 20 weight percent of Attapulgite-150 clays. Further, other clays may be substituted for these two clays to achieve desirable properties for specific applications.

The fly ash used in the present invention is preferably Centralia, Washington Class F Fly Ash. The fly ash is generally incorporated into grout mixtures as a filler material in order to reduce the amount of costly cement used in the material. Fly ash is a relatively inexpensive material which provides excellent properties to the grout. For instance, the compressive strength of the grout material will increase with increasing amounts of fly ash content. This is important because resistance to compression is often important in grout formulation since increases in surface area, as a result of fractured grout, generally lead to increased leaching of hazardous waste materials out of the grout materials. Other types of fly ash may be substituted for this particular type depending upon the properties of the grout desired, the availability of the fly ash and the cost of the material.

Other ingredients may be incorporated into the grout materials of the present invention as long as the other materials do not interfere with the activity of the ionic aluminum compounds. Such other materials may include fillers, rheology control agents and additives for neutralization of specific materials which may be present in the aqueous waste material. These other materials are added to adjust the properties of the resultant grout for specific waste disposal situations.

Waste materials to be immobilized by the formulations and methods of the present invention are generally hazardous industrial waste materials containing common undesirable waste compounds. The principal chemical components of these waste materials are generally common anions found in wastes such as nitrates, sulfates, fluorides and hydroxides. Numerous other compounds may also be present in these waste materials in small quantities. Compounds such as cesium compounds, arsenic compounds, mercury compounds, lead compounds, zinc compounds, uranium compounds, zirconium compounds, copper compounds, chromium compounds, cadmium compounds and many other metal compounds may be found in these type of industrial waste materials. The grout mixes are prepared by combining the waste material in aqueous form with the dry-solid blends. Then, the waste material and dry-solid blends are thoroughly mixed and cured for a period of 28 days.

The invention relates to a method and the composition for reducing the drainable water content of the grout during and after curing. This is accomplished by adding an ionic aluminum compound to the aqueous waste material prior to blending with the dry-solid blend, or alternatively adding an ionic aluminum compound to the mixer along with the aqueous waste material and the dry-solid blend. A significant reduction in drainable water is realized by the addition of the ionic aluminum compound to the grout material.

Suitable aluminum compounds which are useful in the invention are ionic species of aluminum compounds. Suitable ionic aluminum compounds useful in the present include, but are not limited to, aluminum nitrate, aluminum hydroxide, aluminum phosphate and aluminum sulfate.

The ionic aluminum compounds are generally added to the grout material in the form of an admixture. A plastiment may be added separately to improve the properties of the waste disposal material. A typical admixture is a 2.48 molar solution of ionic aluminum compound. Other possible mixtures may be used.

The amount of ionic aluminum compound that is added to the waste material is an amount sufficient to cause a reduction in the amount of drainable water in the cured grout material. Generally, from about 0.1 to about 2.0 volume percent of 2.48 molar ionic aluminum compound solution (based on waste volume) is added to the waste material. More preferably, from about 0.5 to about 1.5 volume percent of 2.48 molar ionic aluminum compound admixture is added to the waste material. If the ionic aluminum compound is added as a solid to the mixer along with the aqueous waste material and the dry-solid blend, the same total moles of ionic aluminum compound is used.

Grout materials prepared using the aluminum compound admixtures of the invention showed significant reductions in the amount of drainable water obtained from cured grout. In addition, the use of the aluminum compound admixtures eliminates the need for using Attapulgite-150 clay. This is advantageous because Attapulgite-150 clay is generally more expensive than the aluminum compound admixtures. In addition, the Attapulgite-150 clay is a naturally occurring, mined material having a varying composition. This leads to significantly less control of quality of the geling clay as compared to the aluminum compound admixtures which are manufactured substances having well-defined, analyzable compositions and properties. Moreover, rheological and phase separation properties of a grout mixture have a tendency to depend on the blending time of blends containing Attapulgite-150 clay. This problem is eliminated using aluminum compound admixtures.

The following examples are provided to illustrate specific embodiments of the present invention.

EXAMPLE 1

Comparison of grout containing Attapulgite-150 clay with grout containing monobasic aluminum nitrate admixture

| | Grout with Gelation Clay[a] | Grout[b] with Admixture[c] |
|---|---|---|
| Mix ratio (lb/gal) | 8 | 8 |
| Apparent viscosity (cP) | 18 | 7 |
| 10 min gel strength (lbf/100 ft$^2$) | 30 | 11 |
| Density (lb/gal) | 12.33 | 12.36 |
| 1 day phase separation (vol %) | 8.2 | 2.4 |
| 2 day phase separation (vol %) | 7.3 | 1.7 |
| 7 day phase separation (vol %) | 6.0 | 0.0 |
| 14 day phase separation (vol %) | 4.9 | 0.0 |
| 21 day phase separation (vol %) | 4.2 | 0.0 |
| 28 day phase separation (vol %) | 4.0 | 0.0 |
| Penetration resistance (psi) | 3840 | 4800 |
| At reference condition: (2 in-ID pipe) | | |
| Reynolds number | 5249 | 16,626 |
| Critical flow rate (gal/min) | 26 | 9.6 |

[a]Type I–II La Portland cement, 38.0 wt. %; Centralia, Washington class F fly ash, 44.0 wt. %; Attapulgite-150 clay, 10.0 wt. %; Indian Red Pottery Clay, 8.0 wt. %.
[b]Type I–II La Portland Cement, 38.0 wt. %; Centralia, Washington class F fly ash, 54 wt. %; Indian Red Pottery Clay, 8 wt. %.
[c]1.0 vol. % 3 M AlOH(NO) plus 0.2 vol. % plastiment admixtures to waste

EXAMPLE 2

Grouts with dry-solids Blend D-2[a] and Multi-Component HFW with aluminum nitrate admixture, mix ratio constant at 8 lb/gal.

| Admixture added | $Al(NO_3)_3.9H_2O$ | | | |
|---|---|---|---|---|
| moles/liter of waste | 0.020 | 0.028 | 0.035 | 0.050 |
| Apparent viscosity (cP) | 12 | 12 | 12 | 12 |
| 10 min gel strength (lb$_f$/100 ft$^2$) | 28 | 168 | 220 | 130 |
| Density (lb/gal) | 12.44 | 12.38 | 12.34 | 12.4 |
| Fluid consistency index (K') (lb · sec$^{n'}$/ft$^2$) | 0.002 | 0.001 | 0.001 | 0.002 |
| Flow behavior index (n') | 0.667 | 0.732 | 0.707 | 0.641 |
| 1 d phase separation (vol %) | 12.5 | 1.2 | 0.10 | 0 |
| 2 d phase separation (vol %) | 11.0 | 0.2 | 0 | 0 |
| 7 d phase separation (vol %) | 10.3 | 0 | 0 | 0 |
| 14 d phase separation (vol %) | 8.8 | 0 | 0 | 0 |
| 28 d phase separation (vol %) | 8.5 | 0 | 0 | 0 |
| At reference conditions: | | | | |
| Reynolds number | 8018 | 9708 | 8774 | 8422 |
| Frictional pressure loss per 100 ft of pipe (psi) | 0.64 | 0.43 | 0.52 | 0.62 |
| Critical flow rate (gal/min) | 18.3 | 14.9 | 16.5 | 18.0 |
| Pump head pressure (psi/100 ft$^2$) | 4.7 | 28 | 36.7 | 21.7 |

[a]Type I–II Portland cement, 38.0 wt %; Centralia, WA class F fly ash, 44.0 wt %; Attapulgite-150 clay, 10.0 wt %; Indian Red pottery clay, 8.0 wt %

EXAMPLE 3

| Grouts with dry-solids Blend D-10[a] and Multi-Component HFW with aluminum nitrate admixture, mix ratio constant at 8 lb/gal. | | | | |
|---|---|---|---|---|
| Admixture added | $Al(NO_3)_3 9H_2O$ | | | |
| moles/liter of waste | 0.010 | 0.020 | 0.028 | 0.028[b] |
| Apparent viscosity (cP) | 13 | 10 | 8 | 7.5 |
| 10 min gel strength ($lb_f/100\ ft^2$) | 100 | 147 | 272 | 48 |
| Density (lb/gal) | 12.48 | 12.41 | 12.40 | 12.36 |
| Fluid consistency index (K') ($lb \cdot sec^{n'}/ft^2$) | 0.002 | 0.004 | 0.003 | 0.001 |
| Flow behavior index (n') | 0.638 | 0.522 | 0.544 | 0.635 |
| 1 d phase separation (vol %) | 11.9 | 3.82 | 2.26 | 1.16 |
| 2 d phase separation (vol %) | 11.1 | 3.40 | 0.7 | 0.02 |
| 7 d phase separation (vol %) | 9.0 | 1.72 | 0 | 0 |
| 14 d phase separation (vol %) | 8.1 | 0.60 | 0 | 0 |
| 28 d phase separation (vol %) | 7.6 | 0 | 0 | 0 |
| At reference conditions: | | | | |
| Reynolds number | 8602 | 8947 | 11,148 | 15,165 |
| Frictional pressure loss per 100 ft of pipe (psi) | 0.61 | 0.67 | 0.48 | 0.26 |
| Critical flow rate (gal/min) | 17.7 | 18.7 | 15.9 | 11.7 |
| Pump head pressure ($psi/100\ ft^2$) | 16.7 | 24.5 | 45.3 | 8.0 |

[a]Type I–II Portland cement, 38.0 wt %; Centralia, WA class F fly ash, 54.0 wt %; Attapulgite-150 clay, 0.0 wt %; Indian Red pottery clay, 8.0 wt %
[b]Included 0.2 vol % Pozzolith 122-R.

EXAMPLE 4

| Grouts with dry-solids Blend D-23[c] and Multi-Component HFW with aluminum compound[b] and Plastiment[c] admixtures. | | | | |
|---|---|---|---|---|
| Mix ratio (lb/gal) | 6 | 7 | 8 | 9 |
| Apparent viscosity (cP) | 6 ± 0 | 6 ± 1 | 8 ± 1 | 9 ± 0 |
| 10 min gel strength ($lb_f/100\ ft^2$) | 1.4 ± 8 | 2.0 ± 0 | 15 ± 4 | 24 ± 7 |
| Density (lb/gal) | 11.78 ± .04 | 12.05 ± .07 | 12.44 ± .04 | 12.7 ± 0 |
| Fluid consistency index (K') ($lb \cdot sec^{n'}/ft^2$) | .0004 ± .0001 | .0004 ± 0 | .0005 ± .0001 | .0005 ± 0 |
| Flow behavior index (n') | .774 ± .062 | .773 ± .008 | .803 ± .081 | .813 ± .009 |
| 1 d phase separation (vol %) | 11.60 | 3.24 | 3.60 | 10.96 |
| 7 d phase separation (vol %) | 9.78 | 1.56 | 1.56 | 8.60 |
| 21 d phase separation (vol %) | 8.96 | 0.12 | 0 | 7.52 |
| 28 d phase separation (vol %) | 8.72 | 0 | 0 | 7.60 |
| 28 d compressive strength (psi) | 268 ± 54 | 302 ± 4 | 415 ± 9 | 680 ± 37 |
| At reference conditions: | | | | |
| Reynolds number | 20858 ± 450 | 20735 ± 765 | 14935 ± 2392 | 14018 ± 687 |
| Frictional pressure loss per 100 ft of pipe (psi) | .11 ± .02 | .11 ± 0.0 | .18 ± .01 | .20 ± .01 |
| Critical flow rate (gal/min) | 7.69 ± .87 | 7.73 ± .14 | 9.77 ± .24 | 10.10 ± .30 |
| Pump head pressure ($psi/100\ ft^2$) | .23 ± .13 | .33 ± 0.0 | 2.5 ± .71 | 4.0 ± 1.18 |

[a]Type I–II Portland cement, 41.5 wt %; Centralia, WA class F fly ash, 50.5 wt %; Attapulgite-150 clay, 0 wt %; Indian Red pottery clay, 8.0 wt %
[b]1.0 vol % 2.48 M $A10H(NO_3)_2$
[c]0.2 vol % Plastiment It will be apparent to those of ordinary skill in the art that various modifications and variations of the invention can be made without departing from the scope or spirit of the invention. Accordingly, the scope of the invention is to be determined by the claims appended hereto.

What is claimed is:

1. A composition for use as a waste disposal grout comprising:

an aqueous waste material;

from about 6.0 to about 10.0 pounds of dry-solid blend per gallon of said waste material, said dry-solid blend comprising 30–45 weight percent cement, 5–30 weight percent clay, and 30–62 weight percent fly ash; and an ionic aluminum compound selected from the group aluminum nitrate, aluminum hydroxide and aluminum phosphate in an amount to significantly reduce the drainable water in the cured grout.

2. A composition in accordance with claim 1 wherein said amount of ionic aluminum compound comprises from about 0.00248 moles to about 0.0496 moles per liter of said waste material.

3. A composition in accordance with claim 2 wherein said dry-solid material comprises 6–10 weight percent of illitic clay.

4. A composition in accordance with claim 3 wherein said dry-solid material further comprises 8–20 weight percent of Attapulgite-150 clay.

5. A process for the immobilization of waste in cement-based materials comprising the steps of:

mixing an aqueous waste material with an amount of ionic aluminum compound sufficient to reduce the amount of drainable water in the resulting cement-based material and with from about 6.0 to about 10.0 pounds of a dry-solid material per gallon of said waste material, said dry-solid material comprising 30–45 weight percent cement, 5–30 weight percent clay, and 30–62 weight percent fly ash; and curing the mixture to produce a solid cement-based material.

6. A process in accordance with claim 5 wherein said amount of ionic aluminum compound comprises from about 0.00248 moles to about 0.0496 moles per liter of said waste material.

7. A process in accordance with claim 6 wherein said aluminum compound is selected from the group consisting of aluminum nitrate, aluminum hydroxide, aluminum phosphate and aluminum sulfate.

8. A process in accordance with claim 7 wherein said dry-solid material comprises 6 to 10 weight percent of Indian Red pottery clay.

9. A process in accordance with claim 8 wherein said dry-solid material further comprises 8 to 20 weight percent of Attapulgite-150 clay.

* * * * *